United States Patent [19]
Xuan et al.

[11] Patent Number: 6,147,322
[45] Date of Patent: Nov. 14, 2000

[54] LASER TEXTURING MAGNETIC RECORDING MEDIUM WITH ULTRA-FINE TEXTURE PATTERN

[75] Inventors: Jialuo Jack Xuan, Milpitas; Chung-Yuang Shih, Cupertino, both of Calif.

[73] Assignee: Seagate Technology LLC, Scotts Valley, Calif.

[21] Appl. No.: 09/125,152
[22] PCT Filed: Aug. 10, 1998
[86] PCT No.: PCT/US98/16655
  § 371 Date: Aug. 10, 1998
  § 102(e) Date: Aug. 10, 1998
[87] PCT Pub. No.: WO99/11418
  PCT Pub. Date: Mar. 11, 1999

Related U.S. Application Data

[60] Provisional application No. 60/057,323, Sep. 2, 1997.
[51] Int. Cl.[7] .................................................. B23K 26/36
[52] U.S. Cl. ................................. 219/121.69; 219/121.68
[58] Field of Search ........................ 219/121.68, 121.69, 219/121.61; 264/400; 360/135; 427/554, 555; 355/67

[56] References Cited

U.S. PATENT DOCUMENTS

| | | | |
|---|---|---|---|
| 5,279,775 | 1/1994 | Thomas et al. | 219/121.69 |
| 5,283,773 | 2/1994 | Thomas et al. | |
| 5,416,298 | 5/1995 | Roberts | 219/121.68 |
| 5,760,880 | 6/1998 | Fan et al. | 355/67 |
| 5,910,262 | 6/1999 | Baumgart et al. | 219/121.68 |

*Primary Examiner*—Geoffrey S. Evans
*Attorney, Agent, or Firm*—McDermott, Will & Emery

[57] ABSTRACT

A method and apparatus for laser texturing data storage media surfaces to provide ultra-low glide avalanche in disk drives employs a continuous wave laser that is randomly modulated. A random signal generator produces a random signal that controls an acousto-optical modulator. The acousto-optical modulator, in accordance with the random signal, modulates the laser beam output of a continuous wave laser. A controllable, repeatable pattern is provided on the data storage media surface by the laser texturing with limited randomness in the circumferential direction to avoid resonance effects on a slider.

19 Claims, 3 Drawing Sheets

LASER TEXTURING MAGNETIC RECORDING MEDIUM WITH ULTRA-FINE TEXTURE PATTERN

RELATED APPLICATIONS

This application claims priority from provisional patent application Ser. No. 60/057,323 filed Sep. 2, 1997, the entire disclosure of which is hereby incorporated by reference herein.

TECHNICAL FIELD

The present invention relates generally to laser texturing a magnetic recording medium. The present invention is particularly applicable to laser-assisted ultra-fine texturing a pattern on the data storage media surface of a magnetic recording medium.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface and is supported on a bearing of air as the disk rotates, such that the head can be freely moved in both the circumferential and radial directions to allow data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, and sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, then the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head challenges the limitations of conventional technology for controlled texturing to avoid head crash.

Conventional techniques for providing a disk substrate with a textured surface comprise a mechanical operation, such as polishing. In texturing a substrate for a magnetic recording medium, conventional practices comprise mechanically polishing the surface to provide a data zone having a substantially smooth surface and a landing zone characterized by topographical features, such as protrusions and depressions. See, for example, Nakamura et al., U.S. Pat. No. 5,202,810. Conventional mechanical texturing techniques, however, are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing with attendant scratches and debris makes it difficult to obtain adequate data zone substrate polishing for proper crystallographic orientation of a subsequently deposited magnetic layer. In addition, various desirable substrates are difficult to process by mechanical texturing. This undesirably limiting facet of mechanical texturing, virtually excludes the use of many materials for use as substrates.

Some important parameters of a media surface that affect performance are the roughness level (Ra) and the glide avalanche. The roughness level is a measure of the average roughness of the surface and the glide avalanche is a measure of how close to the surface a flying head can fly. FIG. 1 depicts an exemplary glide testing profile of a media surface that has been textured by mechanical polishing techniques to a roughness level of Ra=7.2 Å. The glide avalanche of such a surface based on this testing is below 0.6 $\mu$(at about 0.55 $\mu$").

The flying performance of a Winchester-type slider is primarily affected by the micro-waviness that is close to the low frequency portion of the roughness profile. A low frequency profile of the exemplary surface profile of FIG. 1 is depicted in FIG. 2. The bumps created by the mechanical texturing vary greatly in size over a range of 200 $\mu$m in the radial direction of the disk. The largest bump in FIG. 2 is 50 Å high, and the other bumps have lesser heights. The surface profile is thus a relatively random profile, with no specified number of peaks, nor defined heights of the bumps and depths of the valleys. Since the dominant factors affecting the glide avalanche are the low frequency profile and the maximum overall height of the surface, the randomness of the low frequency profile created by mechanical polishing leads to an unpredictable glide avalanche and an unpredictable flying head performance. This is so even though the overall average roughness is 7.2 Å, since this parameter represents an average and does not necessarily reflect the extent and number of peaks and valleys on the surface.

An alternative technique to mechanical texturing for texturing a landing zone comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791.

In copending application Ser. No. 08/666,374 filed on Jun. 27, 1996, now U.S. Pat. No. 5,968,608, a laser texturing technique is disclosed employing a multiple lens focusing system for improved control of the resulting topographical texture. In copending application Ser. No. 08/647,407 filed on May 9, 1996, now U.S. Pat. No. 5,783,797, a laser texturing technique is disclosed wherein a pulsed, focused laser light beam is passed through a crystal material to control the spacing between resulting protrusions.

In copending U.S. Pat. No. 5,955,154, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clam, Calif., Aug. 19–21, 1996.

In copending application Ser. No. 08/796,830 filed on Feb. 7, 1997, now U.S. Pat. No. 5,714,207, a method is disclosed for laser texturing a glass or glass-ceramic substrate, wherein tie height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam.

Although laser texturing techniques have proven advantageous, they have not been hitherto employed to texture an ultra-fine pattern on a media surface to have an ultra-low asperity height while ensuring overall tribological glide performance. In order to ensure the tribological glide performance, uniform wave heights represented by elongated aspirates are needed.

SUMMARY OF THE INVENTION

There is a need for a method of texturing data storage media surfaces to provide ultra-low glide avalanche while ensuring overall tribological performance for light-load, low-glide sliders.

There is a need for data storage media that have media surfaces with ultralow glide and tribological characteristics, and an apparatus for creating the same.

These and other needs are met by the present invention that provides an arrangement comprising a laser and means for forming a texture pattern on a surface with the laser. In certain embodiments of the invention, the means for forming a texture pattern includes a modulator that modulates the laser energy output by the laser, and a random signal generator that controls the modulation of the laser energy output by the modulator.

One of the advantages of the present invention is that the laser micro-machining apparatus of the present invention can create randomly elongated asperities. For example, the asperity height can be kept low (e.g., about 50 Å in height) with 200 μm cycle intervals in the circumferential direction, multiple cycles per 200 μm in the radial direction, and an average horizontal-to-vertical ratio of 4000:1. These exemplary parameters compare very favorably to the scale ratio of about 100:1 by current laser-textured bumps. Since there are no deep valleys on the media surface, there is less air turbulence and easier lubrication at the asperity tips. Also, uniform wave-heights (or asperity-heights) provide a more stable air bearing under the flying slider, as well more even contacts between the slider and the media surface when the slider is resting on the surface. Hence, even though the asperity height is low, the overall tribological performance is ensured for light-load, low-glide sliders.

The earlier stated needs are met by another aspect of the present invention that provides a method of producing an ultra-fine texture pattern on a data storage media surface for ultra-low glide and tribology performance. In this method, a laser beam is randomly modulated and focused on the data storage media surface to create randomly elongated asperities on the media surface. With this method, a media surface is created having a uniformity that is represented by regular asperity heights, regular intervals in the radial direction of the media surface (such as a disk), and limited randomness in the circumferential direction.

The earlier stated needs are also met by another aspect of the present invention that provides a magnetic recording medium having a textured media surface. The average horizontal-to-vertical ratio of the bumps created on the textured surface is approximately 4000:1. In certain embodiments of the invention, the overall height of the bumps (or asperities) is about 50 Å, and there is a 200 μm cycle-interval in the circumferential direction and multiple cycles per 200 μm in the radial direction. The surface is characterized by regular asperity heights, regular intervals in the radial direction of the media surface, and limited randomness in the circumferential direction.

The foregoing and other features, aspects and advantages of the present invention will become apparent from the following detailed description of the present invention when taken in conjunction with the accompanying drawings.

DETAILED DESCRIPTION OF THE INVENTION

The present invention addresses and solves the problem of controlling the texture of a magnetic recording medium surface in such a way as to provide an ultra-low glide avalanche (e.g. less than 0.6 $\mu''$), but in a controllable and repeatable manner.

Figure 1:
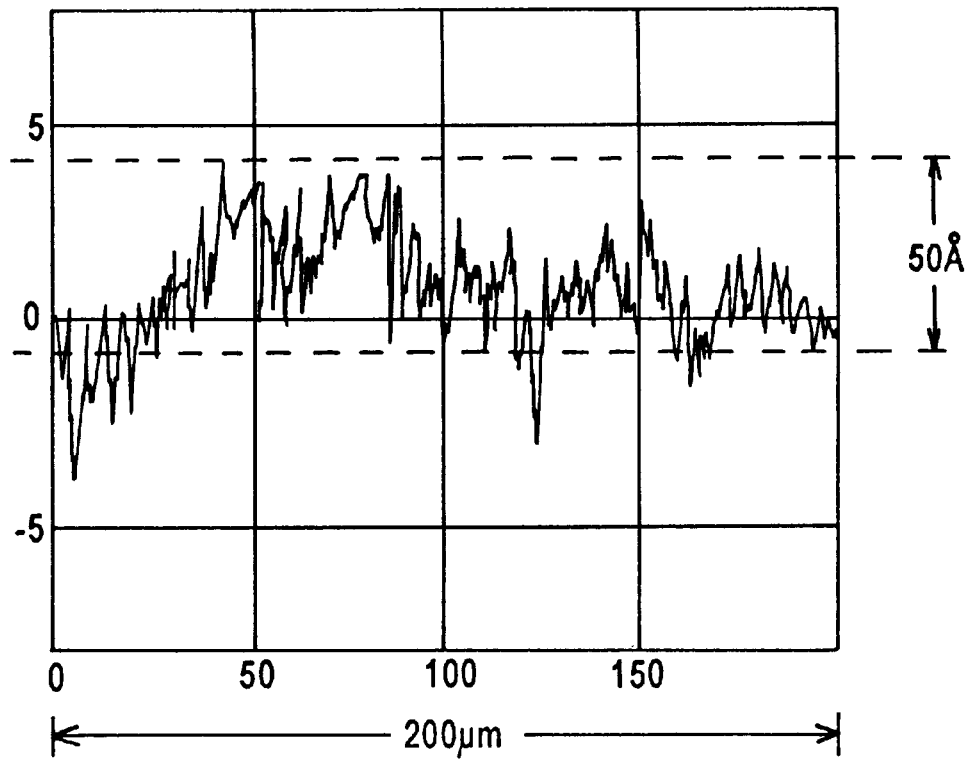
FIG. 1 is a surface profile of an exemplary magnetic recording medium surface that has been mechanically textured in accordance with the prior art.
Figure 2:
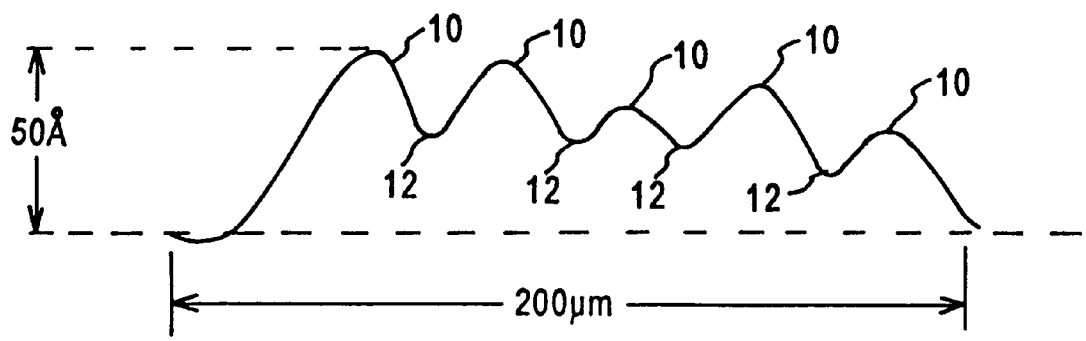
FIG. 2 is a low frequency profile of the surface of the magnetic recording medium having the surface profile of FIG. 1 mechanically textured in accordance with the prior art.

FIG. 1 depicts a two-dimensional representation of the prior art mechanically-textured ultra-fine surface profile of a magnetic recording medium such as a disk. The mechanical polishing of the substrate, leading to the surface profile of FIG. 1, displays many peaks and valleys having very high peaks and very low valleys. The pattern is not controlled due to the use of a slurry during the mechanical polishing procedure. A low frequency profile of the surface spectrum is provided in FIG. 2. This reveals, for example, five peaks 10 and five valleys 12 of varying heights and depths within a 200 $\mu$m range in the radial direction. The highest peak 10 within this 200 $\mu$m range is 50 Å. Hence, with a mechanical polishing, a media surface with an average roughness Ra of 7.2 Å and a glide avalanche of 0.55 $\mu$m may be achieved. However, due to the randomness of the pattern, the air bearing under a flying slider will be less stable as the asperity heights of the peaks 10 vary in a random manner. Furthermore, there is not an even contact between a slider and the medium surface when the stider is resting on the medium surface. Another concern is caused by the varying depths of the valleys 12, which raises concerns regarding the lubrication of the peaks 10 of the asperities. Also, the deep valleys 12 create more air turbulence for the slider.

Figure 3:
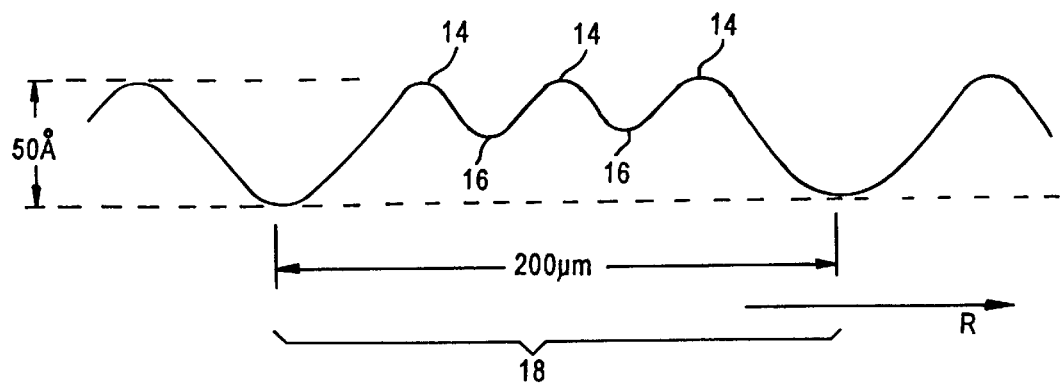
FIG. 3 is a low frequency profile of an exemplary magnetic recording medium surface that has been textured in accordance with an embodiment of the present invention.

FIG. 3 depicts a two dimensional representation of the cross-section of a magnetic recording medium surface profile that has been laser textured in accordance with the present invention. The peaks 14 have a height of approximately 50 Å. Over a 200 $\mu$m range, in the radial direction, a specified number of peaks and valleys are provided. In the exemplary embodiment of FIG. 3, in a 200 $\mu$m cycle (or range), there are three peaks 14 and two valleys 16. Notably, in this embodiment, the peaks 14 of are a substantially uniform height of 50 Å. The uniform wave heights or asperity heights of the peaks 14 provide a very stable air bearing under a flying slider, as well as more even contacts between the slider and the surface when the slider is resting on the surface.

Another feature revealed by the low frequency profile of the magnetic recording media whose surface profile is depicted in FIG. 3, is that none of the valleys 16 are very deep. The absence of deep valleys allows for relatively easy lubrication at the peaks 14 of the asperities. Also, there is a reduced amount of air turbulence than in the prior art, whose low frequency profile reveals deeper valleys. The laser texturing of the surface of the magnetic recording media provides an ultra-low glide avalanche. For example, in the embodiment of FIG. 3, the media surface has a glide avalanche below 0.6 $\mu$m or 150 Å. Prior laser texturing of surfaces were limited to about 200 Å for the glide avalanche. With multiple-cycles of 200 $\mu$m in the radial direction, an average horizontal-to-vertical ratio of 4,000:01 is achieved. This very favorably compares to the average horizontal-to-vertical ratio of approximately 100:01 achieved by current laser-textured asperities.

Figure 4:
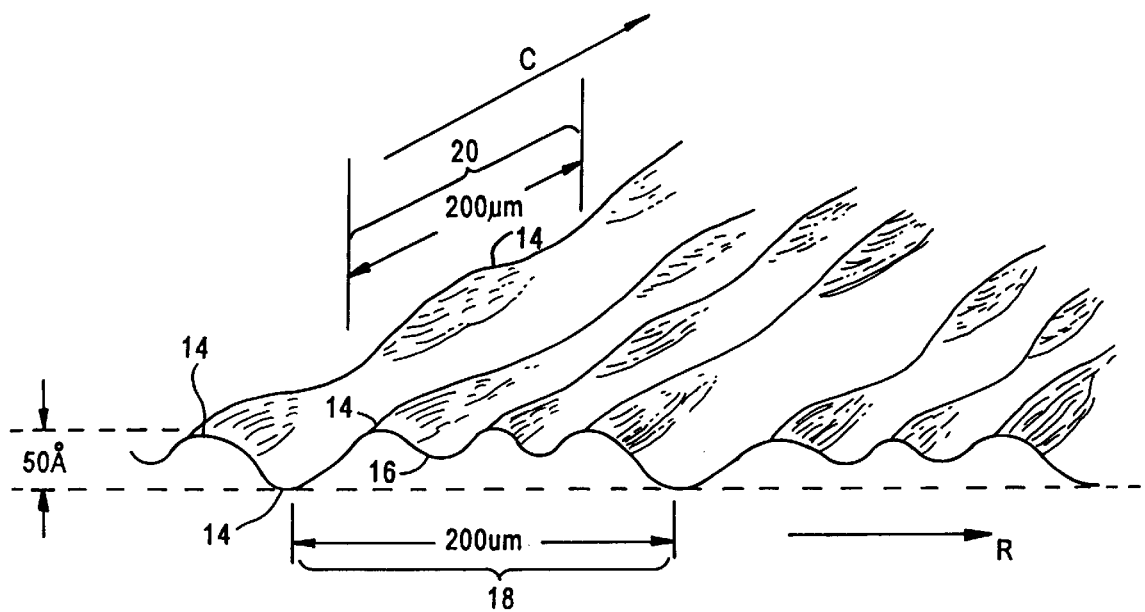
FIG. 4 is a three-dimensional representation of the magnetic recording medium surface of FIG. 3.

FIG. 4 is a three-dimensional representation of the media surface laser-textured in accordance with the embodiments of the present invention. This surface has also been textured to reach a glide avalanche of approximately 0.55 $\mu$m. As in the embodiment of FIG. 3, in a radial direction R there is a cycle 18 of 200 $\mu$m. Within each cycle 18, there are three asperities having peaks 14 and valleys 16. These cycles 18 are repeated in the radial direction R. The cycle-interval in the circumferential direction (arrow C) is also 200 $\mu$m in the exemplary embodiment depicted in FIG. 4. The cycle-interval in the circumferential direction C is denoted with reference numeral 20 in FIG. 4. Unlike the cycle-intervals 18 in the radial direction R, which are regular intervals, the cycle-intervals 20 in the circumferential direction C are more randomly distributed.

The reason that limited randomness in a circumferential direction is advantageous is that it eliminates resonance during operation. As the disk is spun, the randomness of the asperities in the circumferential direction C prevents resonant vibrations from affecting the slider or flying head. Resonance is not as critical a concern in the radial direction of the disk. This is because the head does not travel nearly as fast in the radial direction with respect to the surface of the disk as the disk rotates in a circumferential direction underneath the head. Thus, the cycle-intervals 18 in a radial direction R in the media surface may be made to be regular intervals.

Figure 5:
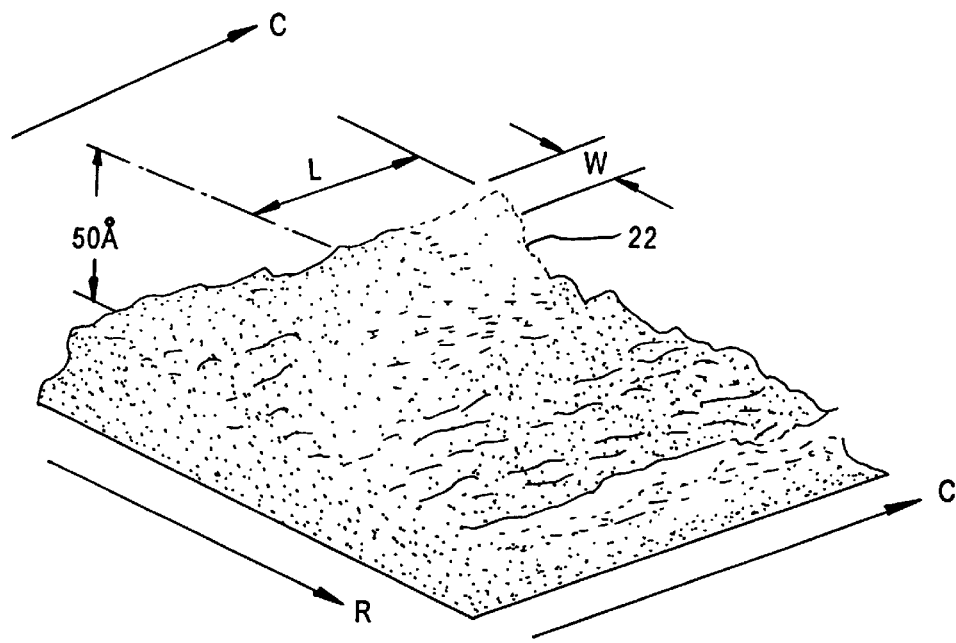
FIG. 5 is a three dimensional microphotograph of an elongated asperity produced in accordance with an embodiment of the present invention.

FIG. 5 is a microphotograph of an exemplary laser textured asperity 22 that is in the circumferential direction C. The single elongated asperity 22 has a height of approximately 50 Å, and has a length L and a width W that is adjustable by suitable configuration of the wafer texturing arrangement.

Figure 6:
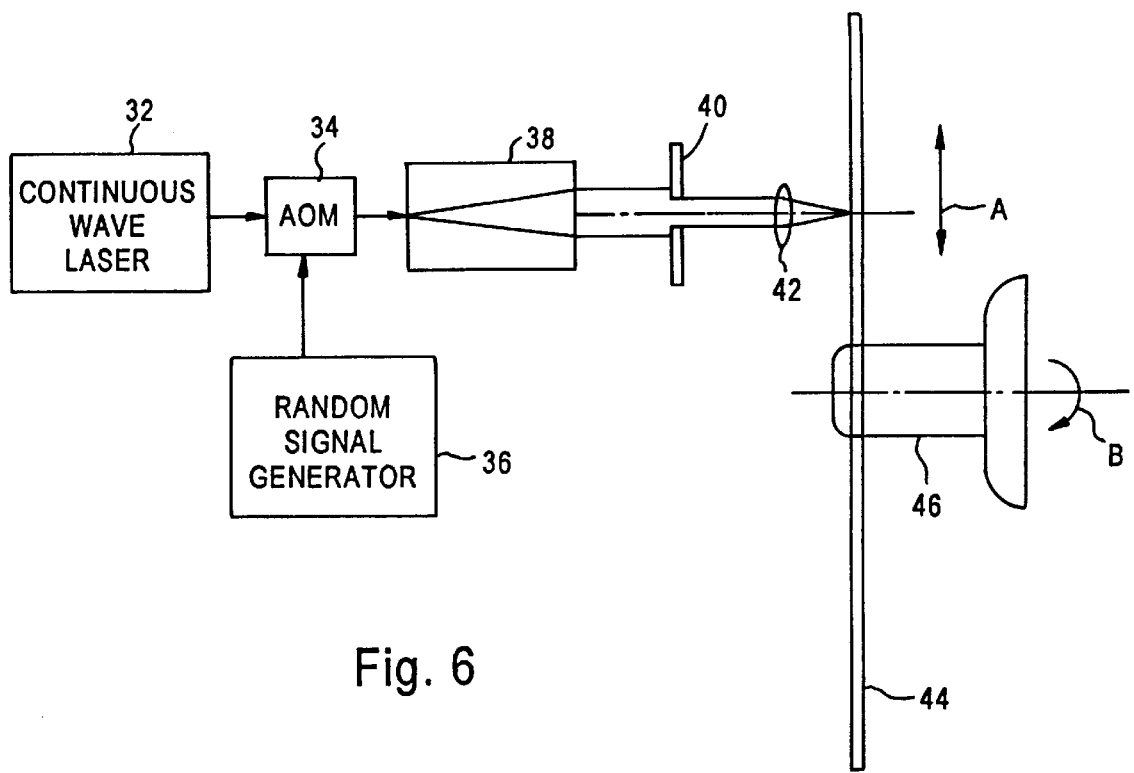
FIG. 6 is a schematic diagram of an arrangement in accordance with an embodiment of the present invention for laser texturing magnetic recording media to produce an ultra-low glide avalanche media surface.

FIG. 6 is an exemplary embodiment of a laser-optic system configured to laser-texture a surface to provide an ultra-low glide avalanche media surface. The laser optics system 30 includes a continuous-wave laser 32 that produces a laser output. This output is then modulated by a modulator 34. In preferred embodiments of the present invention, the modulator 34 is an acoustic-optical modulator that operates to modulate the laser-beam output from the laser 32. The modulation may be performed in many different manners, but in preferred embodiments of the present invention, the modulation is performed randomly. To accomplish this, a random signal generator 36 controls the modulation of the laser-beam through controlling the modulator 34. The random signal generator 36 produces a control signal at random points in time to cause the modulator 34 to pulse the laser beam produced by the continuous-wave laser 32 in a random manner.

The randomly pulsed laser beam modulated by the modulator 34 is received by a beam expander 38 that expands and collimates the laser beam. The expanded, collimated laser beam is passed through an aperture 40 and focused through a focusing lens 42 onto the surface to be textured.

In certain preferred embodiments of the present invention, the recording media to be surfaced is a magnetic recording media such as a magnetic recording disk 44. In order to produce the asperities at intervals that are regular in the radial direction R and of limited randomness in the circumferential direction C, the disc 44 is mounted to a spindle 46 that is moved in two different manners. The spindle 46 is rotated as indicated by arrow B in FIG. 6. At the same time, the spindle 46 is moved to translate the surface of the disk 44 in a vertical direction in FIG. 6, as indicated by arrow A. As can be readily appreciated, the movement of the spindle 46 and the disk 44 in the directions of arrow A may be done in a timed manner in order to provide the regular intervals in a radial direction. The randomness in the circimferential direction C is created by the pulsing of the laser beam through the use of the random signal generator 36 and the modulator 34. Thus, the laser beam energy being applied to the surface of the disk 44 as it is rotated in the direction of arrow B is applied in a randomly pulsed manner. The asperities will be randomly located along a single circular track on a surface of the disk 44. As stated earlier, this limited randomness avoids resonances from being created that will cause vibrations in the slider or in the flying head during operation of the disk drive.

The wavelength of the laser beam produced by the continuous wave laser 32 should be selected to produce the randomly elongated asperities on the surface to be textured due to a thermal expansion effect. For example, when the surface to be textured is a nickel plated substrate, a 1064 nm wavelength laser is appropriate. If the surface to be textured is a glass and/or ceramic substrate, a 10 mm wavelength laser is appropriate to use as the continuous-wave laser 32. If used on other types of materials, one of ordinary skill in the art would select the appropriate wavelength laser 32 to texture the substrate in accordance with the present invention.

The present invention provides a method and apparatus for creating an ultra-low glide avalanche media surface that has a controllable, repeatable texture pattern.

Only the preferred embodiment of the present invention and but a few examples of its versatility are shown and described in the present invention. It is to be understood that the present invention is capable of use in various other combinations and environments and is capable of changes or modifications within the scope of the inventive concept as expressed herein.

What is claimed is:

1. An arrangement comprising:
    a laser;
    and means for forming a texture pattern on a surface with the laser through randomly modulating laser energy output by the laser.

2. The arrangement of claim 1, wherein the means for forming includes a modulator and a random signal generator coupled to the modulator to randomly control modulation of the laser energy output by the modulator.

3. The arrangement of claim 2, wherein the modulator is an acousto-optical modulator.

4. The arrangement of claim 3, further comprising a beam expander that receives and expands modulated laser energy output from the acousto-optical modulator.

5. The arrangement of claim 4, further comprising an aperture and a focus lens that focus the expanded modulated laser energy output from the beam expander onto a surface to be textured.

6. The arrangement of claim 5, wherein the surface to be textured is a surface of a data recording disk.

7. The arrangement of claim 6, further comprising a spindle on which a data recording disk to be textured is mounted and rotated.

8. An arrangement for texturing a media surface to produce randomly elongated asperities on the surface, the arrangement comprising:
    a laser producing a laser output;
    a modulator arranged to receive the laser output and modulate the laser output;
    a random signal generator coupled to the modulator to control the modulation of the laser output by the modulator; and
    a focusing arrangement that focuses the modulated laser output on the surface.

9. The arrangement of claim 8, further comprising a beam expander arranged between the modulator and the focusing arrangement, the beam expander expanding the modulated laser output from the modulator.

10. The arrangement of claim 8, wherein the modulator is an acousto-optical modulator.

11. The arrangement of claim 9, wherein the laser is a continuous wave laser.

12. The arrangement of claim 10, wherein the focusing arrangement includes an aperture and a focusing lens, the aperture disposed between the beam expander and the focusing lens.

13. A method of producing an ultra-fine texture pattern on a data storage media surface for ultra-low glide and tribology performance, the method comprising:
    randomly modulating a laser beam; and
    focussing the randomly modulated laser beam on the data storage media surface to create randomly elongated asperities on the data storage media surface.

14. The method of claim 13, further comprising changing the relative position of the data storage media surface with respect to the randomly modulated laser beam in a translation motion such that the focus of the laser beam on the data storage media surface is moved in a radial direction across the data storage media surface.

15. The method of claim 14, further comprising rotating the data storage media surface under the focus of the laser beam such that the randomly modulated laser beam creates the randomly elongated asperities.

16. The method of claim 13, wherein the step of randomly modulating a laser includes modulating the laser beam acousto-optically.

17. The method of claim 16, wherein the step of randomly modulating includes generating a random signal that controls the acousto-optical modulation of the laser beam.

18. The method of claim 17, wherein the step of randomly modulating includes pulsing the laser beam acousto-optically in accordance with the random signal.

19. The method of claim 13, further comprising changing the relative position of the laser beam on the data storage media surface so as to create asperities on the surface in regular intervals in one direction and with limited randomness in another direction on the data storage media surface.

* * * * *